June 16, 1959 — G. W. ONKSEN ET AL — 2,890,627
METHOD FOR MAKING LENS MOLD
Original Filed March 4, 1950
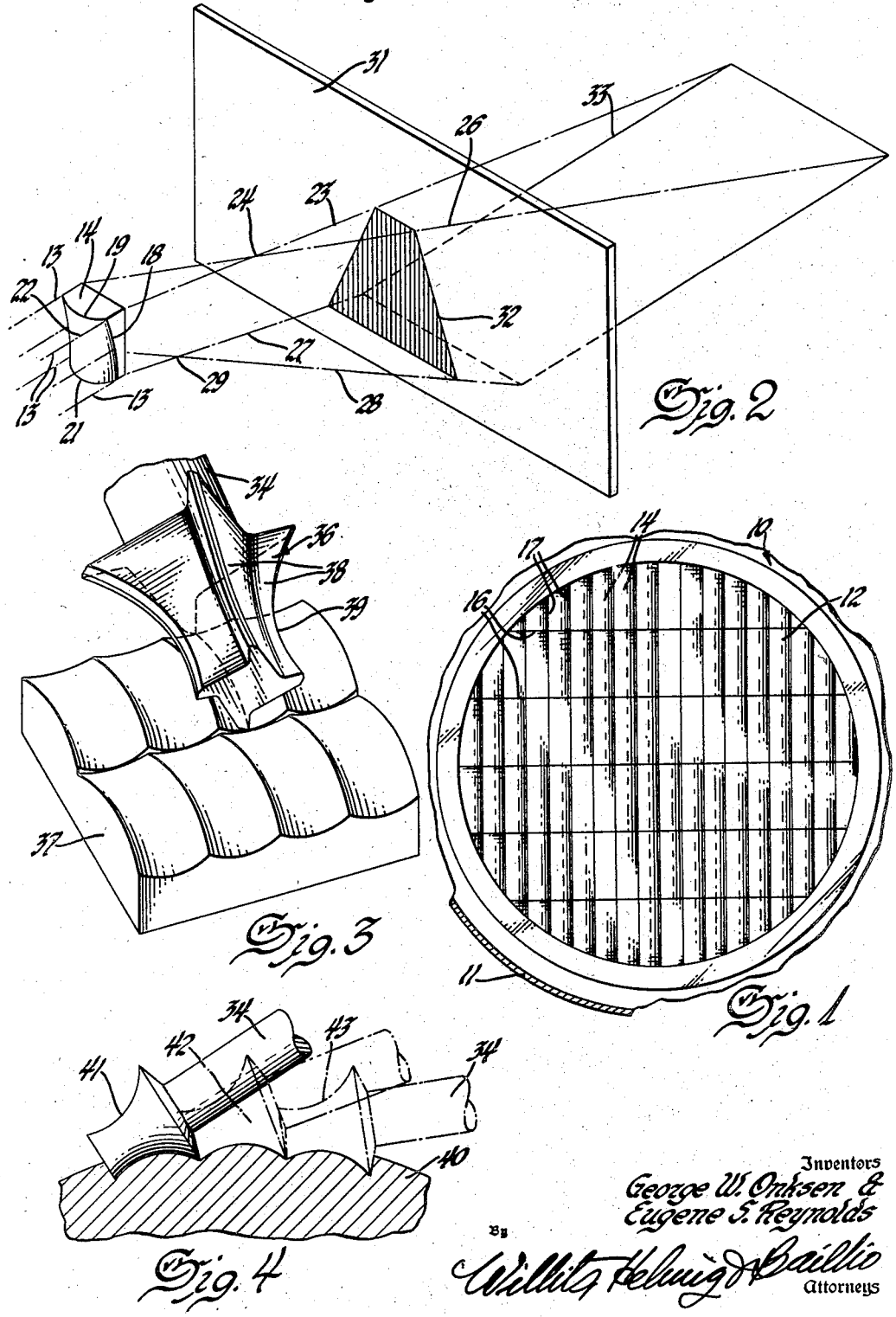

2,890,627
METHOD FOR MAKING LENS MOLD

George W. Onksen, Anderson, Ind., and Eugene S. Reynolds, Dearborn, Mich., assignors to General Motors Corporation, Detroit, Mich., a corporation of Delaware Original application March 4, 1950, Serial No. 147,724. Divided and this application September 21, 1953, Serial No. 381,414

2 Claims. (Cl. 90—11)

This application is a division of our copending application Serial Number 147,724, filed March 4, 1950.

This invention relates generally to the manufacture of lenses for the headlamps of tractors and other automotive vehicles, and for other similar purposes, and it has particular relation to the manufacture of a lens for projecting a particular illumination pattern upon the ground so that the operation of a tractor or other means for carrying the lamp may be facilitated.

It is the object of any lens for use in the headlamps of tractors or other automotive vehicles to project the light from the light source upon the ground and in front of the vehicle in such a way as to illuminate the region in front of the vehicle and the ground or road to be traveled by the vehicle, so that the operation of the vehicle may be observed and may be made safe and easy for the vehicle operator. It has been the practice heretofore to provide lenses for such headlamps for diffusing the light thereof according to various desired patterns.

One method of constructing lenses for such purposes is to provide parallel fluted surfaces projecting in different directions upon opposite surfaces of the lens, the purpose of one set of fluted surfaces being to diffuse or deflect the light in one direction and of the other to diffuse the light in a direction normal thereto. In order to provide a smooth exterior surface for the lens it has also been proposed to interpose these parallel and intersecting sets of fluted surfaces one upon the other and upon the inside surface of the lens. This makes it easy to keep the exterior surface of the lens clean and it makes it possible to mold such a lens by the utilization of a single mold part provided with fluted surfaces.

In constructing lenses with the fluted surfaces thereof intersecting one another and disposed on either one or both sides of the surface of the lens, it has been the custom to design the lens in such a way as to provide the intersecting flutes of each of the parallel sets of flutes with constant radii of curvature from one end to another of the axis of curvature of each flute. With such a lens the pattern of light projected in front of the handlamp and upon a vertical screen may be made of rectangular formation but when this light is projected beyond such a vertical screen and upon a horizontal screen or the ground this rectangular pattern will become a trapezoidal pattern or a pattern which increases in width as the distance from the vehicle increases.

It is now proposed to change a lens of this general character in such a way as to provide a trapezoidal pattern of light upon a vertical screen and a rectangular pattern of light upon a horizontal screen or the ground.

An object of the invention therefore is the manufacture of a lens designed to project a light pattern in such a manner as to diffuse the light throughout a greater angle adjacent the bottom of the lens than at the top thereof. Another object of the invention is to provide a method and apparatus for manufacturing a light diffusing lens having a plurality of intersecting and parallel fluted surfaces thereon, with the radii of curvature of parallel flutes extending horizontally with respect to the lens being constant from one end to another of the axis of curvature of each flute and the radii of curvature of the parallel flutes extending vertically of the lens being variable from one end to another of the axes of curvature of each of such vertical flutes.

For a better understanding of the invention reference may now be had to the accompanying drawing in which:

Figure 1 is a rear elevational view of a headlamp with parts broken away and in section and having a lens embracing the principles of the invention.

Figure 2 is a diagrammatical illustration of the optics involved in the projection of light from a light source through one of the light diffusing elements of the lens illustrated by Figure 1.

Figure 3 is a perspective view of a section of a mold for making lenses embracing the principles of the invention and of a tool employed in the construction of such a mold section. Figure 3 illustrates a mold section for forming the inside surface of a flat or planular lens, as distinguished from a curved lens, such as sometimes are employed in headlamps for tractors and other automotive vehicles.

Figure 4 is a cross-sectional view of a mold section similar to that illustrated by Figure 3, except that the mold section illustrated in Figure 4 is of arcuate cross section, such as is required in making curved lenses for tractors and other automotive vehicles. Figure 4 shows the tool for constructing the mold as the tool is employed in forming the contiguous and compound fluted surfaces of the mold.

In Figure 1 of the drawing there is employed for the purpose of illustration a headlamp 10 comprising a reflector casing 11 and a lens 12, the lens 12 being adapted to diffuse the light from the light source or bulb positioned within the reflector casing 11 and behind the central portion of the lens 12. The light source or bulb is positioned with respect to the light reflector in casing 11 in such a manner as to project forwardly and against the inner surface of the lens 12 an infinite number of relatively parallel rays of light such as are indicated at 13 in Figure 2.

The lens 12 comprises a plurality of contiguous lens sections indicated at 14, each of the sections 14 comprising a compound surface generated by radii of curvature extending from different and angularly related axes of curvature of the surface.

The lens sections 14 are arranged in contiguous relation to one another upon the inner surface of the lens 12 in horizontally and vertically disposed rows of sections, or flutes, which are indicated generally at 16 and 17, respectively. These rows of sections or flutes are formed by parallel flutes 16 extending horizontally of the lens 12 and parallel flutes 17 interposed upon the horizontal flutes 16 and extending vertically of the lens 12.

A perspective view of one of the lens sections 14 is indicated in Figure 2 and in this lens section the curve line or element 18 indicates the radius of curvature of the horizontal fluted sections indicated by the numeral 16 in Figure 1. The radius of curvature is constant from one end to another of the fluted surfaces 16, this being the same as the radius of curvature of the line or element 18 indicated by Figure 2.

The radii of curvature of the vertical flutes 17 are variable from top to bottom of each of the flutes. For example, lines 19 and 21 in Figure 2 indicate elements of curvature of the surface of flutes 17 that differ in radius of curvature. It will be apparent from Figure 2 that the radius of curvature of the line or element 19 is greater than the radius of curvature of the element or line 21, and that the radii of curvature of the compound surface indicated at 22 increase constantly and progressively with respect to the axis of curvature of the curve elements 19 and 21 and with respect to the curvature of line or curve element 18. Also it will be apparent from examining Figures 1 and 2 that the lines or elements 19 and 21 lie approximately in the planes of the opposite edges of each of the fluted surfaces 16 so that each of the vertically fluted surfaces consists of a plurality of horizontally curved elements of decreasing radii of curvature from one edge to another of the fluted surfaces 16.

As will be apparent from examining Figure 2, one of the parallel rays 13 striking the upper adjacent corner of the lens section 14 will be refracted inwardly with respect to the curvature of the element of curvature 19 and upwardly with respect to the curvature of the element of curvature 18, as is indicated at 23, and, at the focal point 24 will cross another ray of light indicated at 26 which is refracted inwardly and upwardly, respectively, with respect to the upper remote corner of the elements 19 and 18 of the lens section 14. Likewise parallel rays of light indicated by the numeral 13 will impinge upon the surface 22 of the lens section 14 at the extremities of the curve element 21 and will refract inwardly and downwardly as is indicated at 27 and 28 and will intersect at focal point 29. Since the radius of curvature of the line or element 21 is less than the radius of curvature of the line or element 19, the rays of light indicated by the lines 27 and 28 will converge to a greater extent on passing through the lens section 14 than will the rays of light indicated at 23 and 26. The focal point 29 therefore will be nearer the lens section 14 than will the focal point 24.

If a vertical screen, indicated at 31, is disposed in front of the lens section 14, the rays of light 23, 26, 27, and 28 will define the corners of a trapezoidal pattern of light incident upon the screen 31 as is indicated at 32.

It will also be apparent from Figure 2 that rays 23, 26, 27, and 28 when projected upon a horizontal screen or upon the ground will define the corner extremities of the rectangular pattern of illumination indicated at 33.

Since the lens section 14 is simply one of a plurality of vertical and horizontal rows of lens sections comprising the lens unit 12, it will be apparent that these lens sections 14 each will impose upon a vertical screen such as that indicated at 31, a trapezoidal pattern of light which is also similar to that indicated at 32. Also it will be apparent that all of the lens sections 14 will impose upon the ground a composite rectangular pattern of light similar to that indicated at 33. The light patterns from each of the sections 14 may be made to overlap one another to a greater or lesser extent depending upon the general curvature of the inner and outer surfaces of the lens 12, but the total pattern of light developed by such overlapping patterns will not differ from the pattern of light made by each lens section 14, as is indicated at 32 on a vertical screen and at 33 on a horizontal screen or the ground.

In order to be able to construct a mold to make a lens such as that indicated at 12 there is provided a tool indicated at 34 having an end mill type cutter 36 the surface of revolution of which is conoidal formed thereon. The cutter 36 is constructed in such way as to cut one compound surface complementary to the compound surface 22 of the lens section 14 at a single operation of the cutting tool, and upon the surface of either of the mold blanks or sections indicated at 37 and 40, in Figures 3 and 4. The mill or cutter 36 may have a plurality of longitudinally disposed cutting teeth 38 formed about the axis thereof and these will be rotated by operation of the tool 34 in such a way as to employ the cutting edges 39 of each of the teeth 38 for removing metal from the blanks. The curvature of the cutting edge 39 of each of the cutting teeth 38 corresponds to the curvature of the horizontally fluted surfaces 16 as is indicated at 18. The curvature of the vertically fluted surfaces 17 will be formed by successive and similar applications of the tool 34 to the blanks 37 and 40, as is indicated in Figure 4 at 41, 42, and 43. The application of the tool may be continued across the mold sections until mold surfaces long enough to form the vertical flutes of the lens 12 have been provided. Each flute 17 of the lens is formed in a similar manner by successively and similarly applying the tool 34 to the surface of the blanks 37 or 40 across the widths of each of the horizontal flutes.

It will be observed that the mill or cutter part 36 of the tool 34 is formed in such a way that the radii of the cutting edges 39 of the teeth 38 are greater at the shank end of the mill than at the opposite or leading end thereof and, that this difference in radii of curvature continues between the opposite ends of the cutter in such a way as to follow the curvature of the cutting edges 39 which is also the curvature of the horizontal flutes 16. The small end of the mill or cutter therefore will cut the end part of each of the contiguous compound surfaces of the mold that corresponds to the curvature of the end of the part or section 14 which is indicated by the curved line 21. The opposite or larger end of the cutter 38 accordingly cuts the parts of such surfaces which correspond to the curvature of the end part indicated at 19.

After the molds 37 or 40 have been formed in the manner previously described, the lens 12 may be made by molding the inner surface of the lens by contact with the mold parts 37 or 40, the opposite or outer surface of the lens being made if desired by molds similar to those indicated at 37 and 40 and complementary thereto but formed by continuous and uninterrupted surfaces.

It will be apparent that when the lens 12 is formed by the use of molds such as those indicated at 37 and 40, the lens will consist of a plurality of contiguous sections 14 each having compound surfaces such as that indicated at 22 and that each of these surfaces 22 forms a curved surface on the lens 12 which is complementary to the configuration of each section of the molds 37 or 40.

It will be apparent that the curvature 39 at the edges of the cutting teeth 38 of the cutting tool 36 may be of any desired curvature. For example, in the drawing, the cutting edges are shown as having a convex curvature, but these edges may even be straight line edges or may be convexly curved edges, depending upon the beam pattern desired. A convex flute having the same radius as that shown would have the same light distribution. Ordinarily the radius of curvature used will be dictated by the vertical spread desired at the base of the beam. Also, occasion might arise when it might be desirable to make a beam pattern with the tapering sides of the trapezoid curved inwardly or outwardly, and it might be desirable to bunch the light rays at the top of the beam to provide a hot spot or bright band at this portion of the pattern. For constructing such patterns, the cutter and lens curvature will be a developed curve of any suitable pattern rather than a curve with a uniform radius and the same center of curvature.

We claim:

1. In a method for shaping a lens mold, the step of forming a rectangular surface of curvature in a mold blank by engaging the surface of said mold blank with a rotating shaping tool, the mold engaging portion of which develops a conoidal surface during rotation thereof about its axis to thereby form a conoidal recess in said surface, said axis being disposed at an acute angle to the surface engaged such that side edges of the said conoidal recess are substantially parallel.

2. In a method for shaping a lens mold, the step of forming a rectangular surface of curvature in a mold blank by engaging the surface of said mold blank with a rotating shaping tool, the mold engaging portions of which are concavely curved cutting edges which develop a conoidal surface during rotation of said tool about its axis to thereby form a conoidal recess in said surface, said axis being disposed at an acute angle to the surface engaged such that side edges of the said conoidal recess are substantially parallel.

References Cited in the file of this patent

UNITED STATES PATENTS

| | | |
|---|---|---|
| 1,104,910 | Latham | July 28, 1914 |
| 1,461,129 | Loomis | July 10, 1923 |
| 1,476,593 | Coffey | Dec. 4, 1923 |
| 1,764,184 | Savidge | June 17, 1930 |
| 2,003,936 | Hucal | June 4, 1935 |
| 2,137,079 | Falge | Nov. 15, 1938 |
| 2,552,455 | Pond | May 8, 1951 |
| 2,633,776 | Schenk | Apr. 7, 1953 |

OTHER REFERENCES

Rowe: Engineering Descriptive Geometry, N.Y., D. Van Nostrand Co., Inc., 1939, p. 147 f.